United States Patent [19]

Torres

[11] 4,225,561
[45] Sep. 30, 1980

[54] CATALYTIC CONVERTER FOR TRANSFORMING POLLUTING GASES INTO NON-POLLUTING GASES

[76] Inventor: Silvestre S. Torres, 30 Poiente No. 1512, Interior 2, Puebla, Pue., Mexico

[21] Appl. No.: 906,390

[22] Filed: May 16, 1978

Related U.S. Application Data

[63] Continuation-in-part of Ser. No. 699,560, Jun. 24, 1976, abandoned.

[30] Foreign Application Priority Data

Jun. 24, 1975 [MX] Mexico .................................. 159191

[51] Int. Cl.$^2$ .......................... B01J 35/04; B01J 8/02; F01N 3/15
[52] U.S. Cl. ................................... 422/171; 422/177; 422/180
[58] Field of Search ................ 699/560; 422/171, 177, 422/180

[56] References Cited

U.S. PATENT DOCUMENTS

| | | | |
|---|---|---|---|
| 2,720,494 | 10/1955 | Suter et al. | 422/211 |
| 2,865,721 | 12/1958 | Lane et al. | 422/191 |
| 3,189,418 | 6/1965 | Gary | 422/180 X |
| 3,259,454 | 7/1966 | Michalko | 422/177 X |
| 3,492,098 | 1/1970 | DePalma et al. | 422/171 |
| 3,495,950 | 2/1970 | Barber et al. | 422/171 |
| 3,716,344 | 2/1973 | Ashburn | 422/180 X |
| 3,773,894 | 11/1973 | Bernstein et al. | 422/180 X |
| 3,785,781 | 1/1974 | Hervert | 422/171 |
| 3,998,599 | 12/1976 | Fedor | 422/180 |
| 4,082,514 | 4/1978 | Torres | 422/177 |

Primary Examiner—Barry S. Richman
Attorney, Agent, or Firm—Edward E. Ayson; John J. Byrne

[57] ABSTRACT

A catalytic converter for transforming polluting gases into non-polluting gases. The converter comprises an open-ended elongated shell of rust-resistant alloy; a transverse partition member comprising a metallic grill coated with silver, palladium or mixtures thereof, within said elongated shell, proximate to and spaced from the open inlet end of the elongated shell; and a metallic mesh, coated with silver, palladium or mixtures thereof in a first open-ended container having its inlet end affixed to the downstream transverse surface of the partition member, and forming a first gas passageway between the elongated shell and the outer surface of the container. A metallic mesh coated with chromium in a second container removably attached to the outlet end of the first container, forms a second gas passageway contiguous with said first gas passageway. The open outlet end of the second container is spaced from the open outlet end of the elongated shell. A specific stepped configuration is used for the containers and a particular rust-resistant alloy is used for the elongated shell.

10 Claims, 3 Drawing Figures

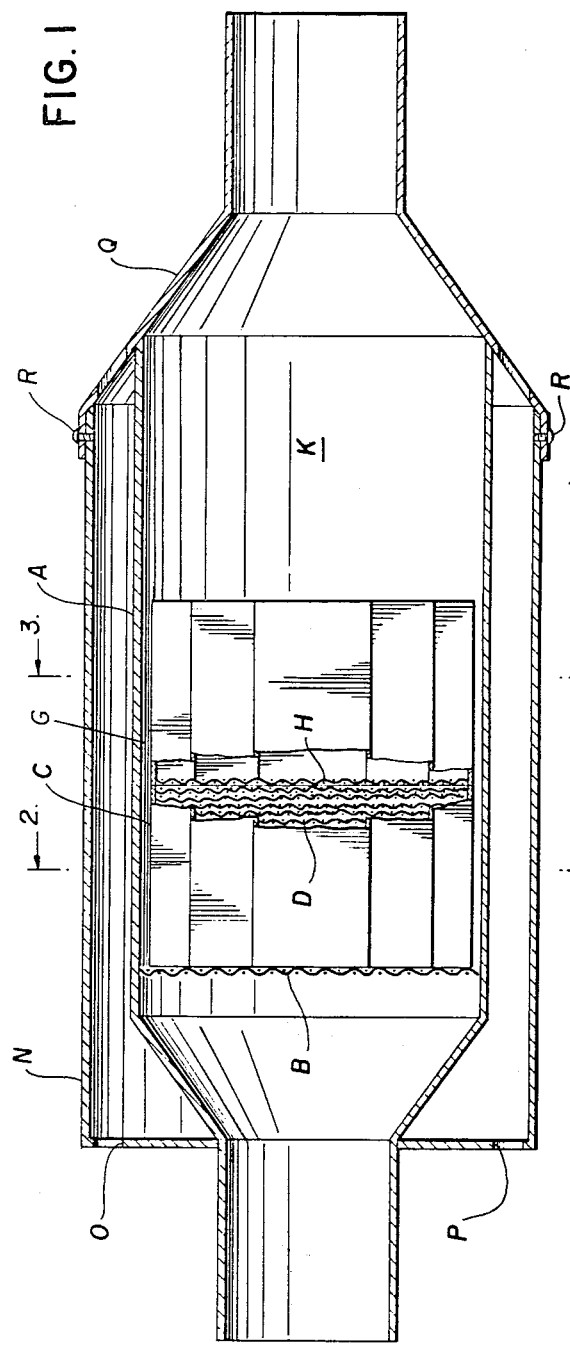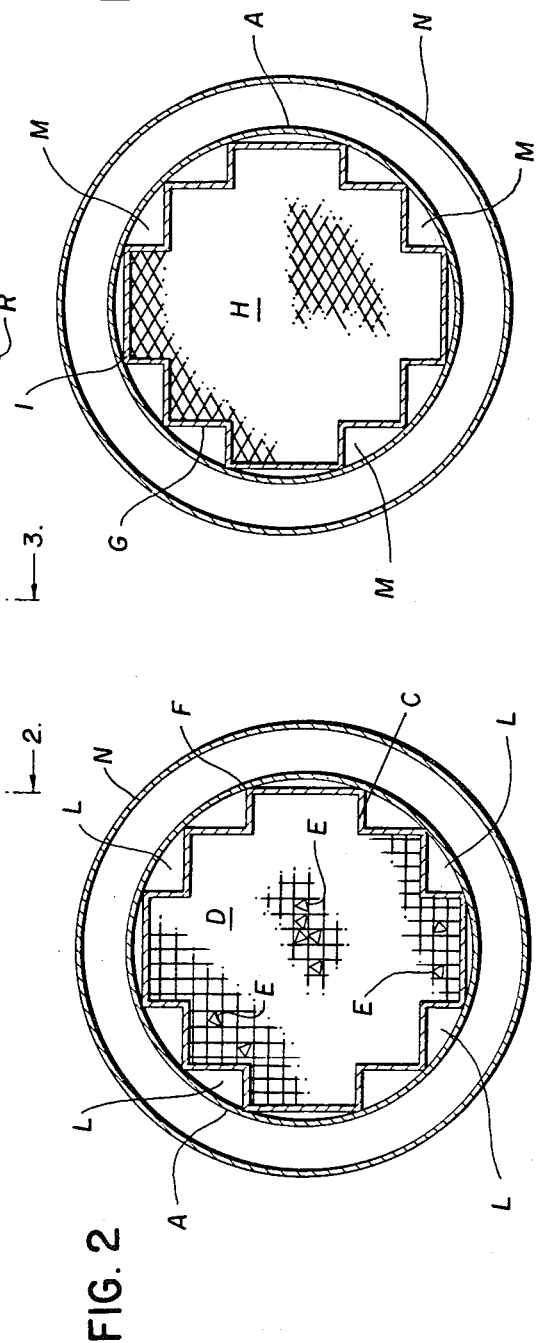

CATALYTIC CONVERTER FOR TRANSFORMING POLLUTING GASES INTO NON-POLLUTING GASES

CROSS-REFERENCE TO RELATED APPLICATION

This application is a continuation-in-part application of Ser. No. 699,560, filed June 24, 1976, and now abandoned, entitled CATALYTIC CONVERTER FOR CONVERTING POLLUTING GASES INTO NON-POLLUTING GASES.

BACKGROUND

This invention relates to a catalytic converter adapted for use in transforming polluting gases to non-polluting gases.

The catalytic converter described in this invention has been created to replace conventional mufflers. The catalytic converter of this invention has the dual function of operating as muffler and catalytic converter.

The detrimental effect of hydrocarbon, carbon monoxide, and nitrogen oxide emissions is well documented. Automobile exhaust emissions are known precursors of photochemical products that cause damage to both animal and plant life.

Carbon monoxide is perhaps the most harmful substance emitted in automobile exhausts. In high concentrations, carbon monoxide can be very hazardous. The effects of extended exposure to low concentrations of untreated automobile exhaust emissions, containing components of known toxicity such as carbon monoxide, presents a potential health hazard.

Incomplete combustion of petroleum fuels because of poor carburation, ignition and spark plug fouling produces exhaust gases containing carbon monoxide, hydrogen, unreacted hydrocarbons and nitrogen oxides.

Gasoline, the most common fuel in automobiles, is a complex mixture of hydrocarbons generally including volatile low molecular weight hydrocarbons as well as compounds containing 20 or more carbon atoms per molecule.

Additives, for example lead compounds used to reduce knocking and compounds for the purpose of controlling freezing in the carburetor, are also frequently present in gasoline.

The object of this invention is to cure the problem of pollution caused by automobile exhaust emissions.

The method of conversion of polluting gases generally comprises the addition of secondary air to the exhausted gases and thereafter the treatment of the resultant gaseous admixture in the catalytic converter of this invention whereby to promote a more rapid burning of the undesirable components of the exhaust gas. The addition of air may be effected in any well-known manner.

The catalytic muffler/converter of this invention attains the advantages of operation by structural modifications, catalyst selection and the use of a new alloy more specifically described in my copending application Ser. No. 699,559 filed June 24, 1976, and now abandoned in favor of application Ser. No. 891,258 filed Mar. 29, 1978, now U.S. Pat. No. 4,147,537 issued Apr. 3, 1979. The catalytic converter of this invention can be used in place of a conventional muffler. Exhaust gas passes through the catalytic components of the catalytic converter whereby the level of carbon monoxide is reduced below the level specified in the most recent United States standards. Operating efficiency of automobiles and trucks is not reduced.

The design of the automotive exhaust systems has developed into a rather complex technology as engine output has been diminished and restrictions have been placed on exhaust systems. The converter, which is the subject of this invention, utilizes a totally new design.

The catalytic converter meets the requirements of space, weight, durability and cost and operates to reduce polluting gas components of the exhaust after they leave the engine.

The catalytic converter described in this invention has been prepared and successfully proven in automotive vehicles to be a satisfactory substitute for conventional mufflers. Moreover, the converter of this invention, besides muffling the sound waves produced by engines, has the added function of transforming the polluting gases into non-polluting gases.

SUMMARY OF THE INVENTION

According to the present invention, a catalytic converter for transforming polluting gases into non-polluting gases is provided. The converter comprises an elongated shell of rust-resistant alloy having an open inlet end to admit polluting gas into the shell and an open outlet end to permit gas to flow out of the shell. A metallic grill coated with silver, palladium or mixtures thereof is used to partition said elongated shell. The grill is located transversely, proximate to and spaced from the open inlet end of the elongated shell. A metallic mesh, coated with silver, palladium or mixtures thereof is placed within a first container which is open at both ends. The inlet end of this container is attached to the downstream transverse surface of the partition member. The configuration of the container is such that at least a portion of the air passing through the grill passes between the outer surface of the container and the interior surface of the elongated shell forming a gas passageway between the elongated shell and the first container.

A metallic mesh covered with chromium in a second container of substantially the same configuration as the previously described container is removably attached to the outlet end of the container holding the silver- or palladium-plated mesh. The second container forms a second gas passageway contiguous with the gas passageway formed between the elongated shell and the silver- or palladium-plated mesh container.

The exterior walls of the aforementioned containers may be of any geometrical configuration, but the stepped configuration, wherein the edge step is affixed to the interior wall of the shell, has some unexpected advantages. The structure is stable and expansion does not affect the bonds at the edges. Moreover, the turbulence created by the geometric configuration when the gases exit from the gas passageway formed between the exterior walls of the containers and the interior wall of the elongated shell enhances admixture and conversion of the gases which have bypassed the catalytically active mesh.

The silver- and/or palladium-coated mesh preferably contains a plurality of triangular-shaped catalytic elements comprised of iridium plated with a metal selected from the group consisting of palladium, silver and mixtures thereof. The triangles may also be placed in the chromium-coated mesh. These triangular-shaped catalytic members must be of a size that fits within the mesh and preferably have a surface area of about 4mm.

Because of the high temperature levels and the nature of the materials being treated, it is essential for extended operation that the rust-resistant alloy utilized for the shell be made of an alloy developed for this purpose. A preferred alloy for this purpose comprises manganese alloyed with 1.0%–2.0% silicon, 0.9%–1.9% copper, 0.5%–0.12% carbon, 0.5%–0.9% iron, 0.2%–2.3% titanium, 15.0%–22.0% chromium, 2.5%–4.0% molybdenum, 5.0%–10.0% aluminum, and 0.1%–0.3% selenium. The manganese must be present in an amount less than about 70.0%. Most preferably, the rust-resistant alloy comprises 1.6% silicon, 1.6% copper, 0.11% carbon, 0.7% iron, 0.3% titanium, 19.0% chromium, 3.1% molybdenum, 8.9% aluminum, and 0.25% selenium with the remainder being manganese.

A covering may be used about the elongated shell. The covering should allow for flow of air over the surface of the shell for cooling purposes.

DESCRIPTION OF THE DRAWINGS

FIG. 1 is a longitudinal cross-section with partial cut-away view of the catalytic mesh containers.

FIG. 2 is a transverse cross-section taken generally at 2.

FIG. 3 is a transverse cross-section taken generally at 3.

DESCRIPTION OF THE PREFERRED EMBODIMENTS

Referring to FIG. 1, A represents the elongated shell of the catalytic converter which encloses the catalytic components thereof.

The shell A is made of a specific alloy developed to withstand the temperatures and conditions of conversion.

The alloy is rust-resistant and comprises manganese alloyed with about 1.0% – about 2.0% silicon, about 0.9% – about 1.9% copper, about 0.5% – about 0.12% carbon, about 0.5% – about 0.9% iron, about 0.2% – about 2.3% titanium, about 15.0% – about 22.0% chromium, about 2.5% – about 4.0% molybdenum, about 5.0% – about 10.0% aluminum, about 0.1% – about 0.3% selenium with the manganese being present in amount less than about 70.0%.

The alloy may be hardened by precipitation or cold rolling; generally has a tension resistance of about 8,750 to 12,980 Kgs./cm$^2$ and a hardness of about 180 to about 240 Brinell with an elongation of about 24% to about 53%, with an upper limit of 46% preferred.

Preferably, the composition comprises 1.6% silicon, 1.6% copper, 0.11% carbon, 0.7% iron, 0.3% titanium, 19.0% chromium, 3.1% molybdenum, 8.9% aluminum, 0.25% selenium, the remainder being manganese.

The foregoing percentages are expressed on a weight percent basis.

The alloy generally with an elongation of 23% to 45% is preferably used in 1.37 mm$^2$ and 1.21 mm$^2$ gauges. The alloy may be quenched soft, preferably No. 6 Quench, or hard, preferably No. 1 Quench.

3.1% of (Mo) Molybdenum is used to increase resistance to hot chemical products with a small quantity of (Se) Selenium to improve machining. High content of (Cr) chrome is used for strong chemical resistance at high temperatures of operation as found in the converter of this invention.

The grill B comprises a metallic screen which is fixedly attached, such as by welding, to the interior surface of the shell. The grill has a coating of silver and/or palladium thereon. These metals are catalytically active and the exhaust gases passing through the screen, e.g. CO, are oxidized thereby. The base metal may be of the same composition as the shell.

Container C is fixedly attached to grill B, and contains mesh D which in turn is fixedly attached to the interior surface of container C. As best illustrated in FIG. 2, the mesh D preferably has interspersed therein a plurality of triangular-shaped catalytic elements E. A hundred or more of catalytic elements E may be randomly situated within the mesh and are generally attached to the mesh by welding at the points thereof. Where the preferred stepped configuration of container C is employed, the container C is attached to the inner wall of shell A along the edges of each step as illustrated in FIG. 2 at F. Container C may be made of a thin corrosion-resistant metal such as stainless steel, preferably type 316 stainless steel. As well, the alloy used for shell A is suited for this purpose. The mesh is coated with silver and/or palladium which catalyzes the conversion of polluting gaseous exhaust components. The triangular elements E are comprised of a thin-gauge iridium base metal coated with palladium, silver, or a combination of silver and palladium.

Container C is detachably connected to container G. As best illustrated in FIG. 3, mesh H is located within container G. The mesh is fixedly attached to container G as by welding to the interior walls thereof. In the preferred embodiment of this invention where the exterior wall of the containers is of stepped configuration, the edges I of each step generally extend to and fit snugly against the inner wall of container G. Although the edges are not fixedly secured to the wall, such contact provides added stability. Container G is made similarly to container C of a corrosion-resistant metal such as stainless steel, preferably type 316 stainless steel. The mesh H is comprised of a metallic base coated with chrome. The same size mesh is generally used in both containers C and G, although this is not required. Container G may contain triangular elements E, but generally the use of such elements is limited to mesh D in container C. Container G may be coupled to container C in any manner, such arrangements being well known in the art. Container G may be removed when the catalytic component thereof becomes deactivated and another new or regenerated container inserted. The catalytic components of the converter (namely, grill B, catalytic meshes D and H, and triangular elements E) are situated within the elongated shell A to provide for open chambers proximate to each end of the shell. This is essential for muffling, and chamber K proximate the open outlet end of container G is essential in order to allow for admixture of the gases exiting container G with the gases exiting gas passageway M.

As best illustrated in FIG. 2 and FIG. 3, a gas passageway is formed between the elongated shell and containers C and G. The gas passageway is divided horizontally where the stepped configuration is utilized for containers C and G. See L in FIG. 2 and M in FIG. 3. As indicated previously, it is essential that the gas passageway formed by the outer configuration of containers C and G be contiguous. The advantage of allowing free flow of exhaust gases around the restricted flow volume wherein the mesh is situated is that surges in pressure are accommodated without damage to the catalytic components. The exhaust gases passing through gas passageways L and M are first subjected to conversion prior to entering the gas passageways.

Thereafter, the gases are heated by indirect heat exchange with containers C and G and finally upon combination with the very hot gases exiting container G, substantially complete conversion of the as yet unconverted polluting components is effected.

N represents the elongated protective metallic cover which may be used to surround the outer surface of the elongated shell. The cover is spaced from the elongated shell, preferably about ½ inch, and allowance is made for air to pass through openings O and P to cool the outer surface of the elongated shell. A corrosive-resistant metal is preferably used for cover N.

In the embodiment illustrated, removable end portion Q forms the outlet end portion of the elongated shell and the outlet end portion of the cover. Attachment as indicated at R may be in any well-known fashion. As is readily apparent, container G may be removed and replaced simply by removing end portion Q. Removable end portion Q is made of a corrosion-resistant metal, preferably the alloy utilized for shell A.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claims.

I claim:

1. A catalytic converter for transforming polluting gases into non-polluting gases, said catalytic converter comprising:
   (a) an elongated shell of rust-resistant alloy for high temperatures having an open inlet end to admit polluting gas into the shell and an open outlet end to permit flow out of the shell;
   (b) a transverse partition member comprising a metallic grill coated with a catalyst selected from the group consisting of silver, palladium, and mixtures thereof within said elongated shell, proximate to and spaced from the open inlet end of said elongated shell;
   (c) a container having an open inlet end and an open outlet end, the inlet end of said container being fixedly attached to the downstream transverse surface of said partition member at least part of the outer surface of said container being spaced from the interior surface of said elongated shell, thereby forming a gas passageway between said elongated shell and said container;
   (d) a metallic mesh coated with a catalyst selected from the group consisting of silver, palladium, and mixtures thereof confined within said container; and
   (e) a plurality of triangularly shaped catalytic elements comprised of iridium plated with a metal selected from the group consisting of palladium, silver, and mixtures thereof contained in said mesh.

2. The converter of Claim 1 further characterized in that the triangular-shaped catalytic members have a surface area of about 4 mm$^2$.

3. The converter of claim 1 further characterized in that the rust-resistant alloy comprises manganese alloyed with 1.0%-2.0% silicon, 0.9%-1.9% copper, 0.5%-0.12% carbon, 0.5%-0.9% iron, 0.2%-2.3% titanium, 15.0%-22.0% chromium, 2.5%-4.0% molybdenum, 5.0%-10.0% aluminum, 0.1%-0.3% selenium, said manganese being present in amount less than about 70.0%.

4. The catalytic converter of claim 1 further comprising an elongated protective metallic cover surrounding the outer surface of said elongated shell and spaced therefrom to form an open air passageway between said shell and the inner wall of said cover.

5. A catalytic converter for transforming polluting gases into non-polluting gases, said catalytic converter comprising:
   (a) an elongated shell of rust-resistant alloy for high temperatures having an open inlet end to admit polluting gas into the shell and an open outlet end to permit flow out of the shell;
   (b) a transverse partition member comprising a metallic grill coated with a catalyst selected from the group consisting of silver, palladium, and mixtures thereof within said elongated shell, proximate to and spaced from the open inlet end of said elongated shell;
   (c) a first container having an open inlet end and an open outlet end, the inlet end of said first container being fixedly attached to the downstream transverse surface of said partition member, at least part of the outer surface of said first container being spaced from the interior surface of said elongated shell, thereby forming a first gas passageway between said elongated shell and said first container;
   (d) a first metallic mesh coated with a catalyst selected from the group consisting of silver, palladium, and mixtures thereof confined within said first container;
   (e) a second container having an open inlet end and an open outlet end, the inlet end of said second container being removably attached to the outlet end of said first container, at least part of the outer surface of said second container being spaced from the interior surface of said elongated shell, thereby forming a second passageway contiguous with said first gas passageway, the open outlet end of said second container being spaced from the open outlet end of said elongated shell; and
   (f) a second metallic mesh coated with chromium confined within said second container.

6. The catalytic converter of claim 5 further comprising an elongated protective metallic cover surrounding the outer surface of said elongated shell and spaced therefrom to form an open air passageway between said shell and the inner wall of said cover.

7. The catalytic converter of claim 5 further characterized in that the exterior wall of the first and second containers are of stepped configuration, the intersecting edges of each step extending longitudinally relative to the axis of each respective container and being affixed to the interior wall of the elongated shell.

8. The catalytic converter of Claim 7 further characterized in that the intersection edges of each step of the first container are permanently affixed to the interior wall of the elongated shell and the intersecting edges of each step of the second container are detachably affixed to the interior wall of the elongated shell.

9. The converter of claim 5 further characterized in that the rust-resistant alloy comprises manganese alloyed with 1.0%-2.0% silicon, 0.9%-1.9% copper, 0.5%-0.12% carbon, 0.5%-0.9% iron, 0.2%-2.3% titanium, 15.0%-22.0% chromium, 2.5%-4.0% molybdenum, 5.0%-10.0% aluminum, 0.1%-0.3% selenium, said manganese being present in amount less than about 70.0%.

10. The converter of claim 9 further characterized in that the rust-resistant alloy comprises 1.6% silicon, 1.6% copper, 0.11% carbon, 0.7% iron, 0.3% titanium, 19.0% chromium, 3.1% molybdenum, 8.9% aluminum, 0.25% selenium, the remainder being manganese.

* * * * *